US006849226B2

(12) United States Patent
Ardrey et al.

(10) Patent No.: US 6,849,226 B2
(45) Date of Patent: Feb. 1, 2005

(54) METHOD OF FORMING A COMPONENT FOR A CONTROL PANEL

(75) Inventors: Kenneth J. Ardrey, Canton, MI (US); Mark R. Weston, Brighton, MI (US)

(73) Assignee: Key Plastics, LLC, Northville, MI (US)

( * ) Notice: Subject to any disclaimer, the term of this patent is extended or adjusted under 35 U.S.C. 154(b) by 0 days.

(21) Appl. No.: 10/357,956

(22) Filed: Feb. 4, 2003

(65) Prior Publication Data

US 2003/0116415 A1 Jun. 26, 2003

Related U.S. Application Data

(62) Division of application No. 09/972,335, filed on Oct. 5, 2001, now Pat. No. 6,542,353, which is a division of application No. 09/281,155, filed on Mar. 30, 1999, now Pat. No. 6,326,569.

(60) Provisional application No. 60/080,173, filed on Mar. 31, 1998.

(51) Int. Cl.[7] .......................... B29C 51/10; B29C 51/14

(52) U.S. Cl. ....................... 264/514; 264/515; 264/129; 264/132; 264/139; 264/210.1; 264/250; 264/294

(58) Field of Search ........................... 264/210.3, 210.4, 264/132, 129, 553, 514, 515, 245, 294, 250, 139

(56) References Cited

U.S. PATENT DOCUMENTS

| | | | | |
|---|---|---|---|---|
| 4,430,288 A | | 2/1984 | Bonis | |
| 4,862,499 A | | 8/1989 | Jekot et al. | |
| 4,892,700 A | | 1/1990 | Guerra et al. | |
| 4,937,408 A | | 6/1990 | Hattori et al. | |
| 4,968,526 A | * | 11/1990 | Takii et al. | 427/555 |
| 5,040,479 A | | 8/1991 | Thrash | |
| 5,098,633 A | | 3/1992 | Hausler | |
| 5,138,119 A | | 8/1992 | Demeo | |
| 5,387,381 A | * | 2/1995 | Saloom | 264/75 |
| 5,432,684 A | | 7/1995 | Fye et al. | |
| 5,477,024 A | | 12/1995 | Share et al. | |
| 5,480,715 A | * | 1/1996 | Mills et al. | 428/327 |
| 5,536,543 A | | 7/1996 | Papandreou | |
| 5,570,114 A | | 10/1996 | Fowler | |
| 5,614,338 A | | 3/1997 | Pyburn et al. | |
| 5,633,022 A | | 5/1997 | Myers | |
| 5,729,413 A | * | 3/1998 | Gooch et al. | 360/125 |
| 5,736,233 A | | 4/1998 | Fye | |
| 5,739,486 A | | 4/1998 | Buckingham | |
| 5,744,210 A | * | 4/1998 | Hofmann et al. | 428/106 |
| 5,968,657 A | * | 10/1999 | Scullin et al. | 428/423.1 |

FOREIGN PATENT DOCUMENTS

| | | | |
|---|---|---|---|
| JP | 61-51320 | * | 3/1986 |

* cited by examiner

*Primary Examiner*—Edmund H. Lee
(74) *Attorney, Agent, or Firm*—Markell Seitzman; John P. Guenther

(57) ABSTRACT

A control panel assembly having a plurality of buttons located in a bezel and supported by a switch mat. A bezel and/or button is formed using a vacuum forming technique and has a transparent inner surface layer and a middle translucent color layer and an opaque outer surface layer. A portion of the opaque outer surface layer is removed to define a desired indicia on an outer surface of the bezel or button. In addition, the bezel or button can be backlit to allow visibility in low light conditions. A method of making a control panel component, such as a bezel or button, is also disclosed.

8 Claims, 3 Drawing Sheets

84

METHOD OF FORMING A COMPONENT FOR A CONTROL PANEL

This application is a Divisional application of U.S. application Ser. No. 09/972,335, filed on Oct. 5, 2001, now U.S. Pat. No. 6,542,353, which in turn is a Divisional application of U.S. application Ser. No. 09/281,155 filed on Mar. 30, 1999, now U.S. Pat. No. 6,326,569, issued on Dec. 4, 2001, which in turn claims the benefit of U.S. Provisional Application No. 60/080,173, filed on Mar. 31, 1998, the entire contents of all the above-mentioned applications are herein incorporated by reference.

FIELD OF THE INVENTION

The present invention relates to control panel assemblies and a method of making components such as buttons and bezels for use in control panels. More particularly, the present invention is directed to backlit control panel assemblies having indicia that is visible during daytime and nighttime usage.

BACKGROUND OF THE INVENTION

Control panels having backlit buttons are known for use in the interior of automotive vehicles, including radio control buttons and door lock buttons. The purpose of backlit buttons is to allow a user to see the button and its function even in low light situations. Typically, a radio button will have a graphic image or other indicia to indicate a particular purpose. For example, the word "scan" or a number such as "3" is provided on a button to indicate that button's purpose. One known button is made by injection molding a clear plastic material in the form of a button. The button is then painted with a layer of white paint and dried by an oven or other conventional technique. Next, a layer of black paint is applied over the white paint and is subsequently dried. A laser is used to etch away a desired portion of the black paint to form a white graphic image. In a low light situation, the button is illuminated from behind such that the graphic image is visible to a user through the white paint layer.

Another known method of making buttons for a control panel involves providing a transparent member with a black layer on one side and vacuum forming the transparent member with the black layer into a desired shape. Thereafter, a laser passes through the transparent member and etches away a desired portion of the black layer to form a graphic image. Next, a daytime color is pad printed over the black layer side and dried in an oven followed by pad printing a nighttime color on top of the daytime color and oven drying the nighttime color. Finally, the subassembly is placed in an injection molding apparatus and an interior recess of the button is filled with resin during injection molding to make the button more rigid.

It is further known to provide control panels having backlit buttons on a switch pad for resilient switching action. However, the known buttons have a generally flat upper surface to be sure that light can fully reach and evenly illuminate a graphic image on the button. In addition, the graphic image may be partially blocked from illuminating light by part of the switch mat because of the way the button rests on the switch mat. Thus, the graphic image will not be fully visible when backlit.

SUMMARY OF THE INVENTION

The present invention is directed to a control panel assembly and to individual components of that assembly, including, a bezel containing at least one opening and at least one button associated with the bezel. The bezel and/or the button have a main body vacuum formed into a predetermined shape and having an inner surface and an outer surface. The main body includes coextruded first and second layers and a third layer applied to the second layer. Further, the first layer is generally transparent, the second layer is generally translucent, and the third layer is generally opaque. In addition, a resilient switch mat is associated with the at least one button and comprises a generally planar base portion with at least one generally hollow projection for contacting the button. The projection has first and second ends and inner and outer surfaces. Further, the first end of the projection includes a stepped portion for receiving a portion of the button.

Additionally, the present invention can include indicia on the outer surface of the main body of the bezel and/or button. Preferably, the indicia is laser etched into the opaque layer thereby exposing the translucent layer. The transparent first layer can have a thickness of approximately 0.040 inch. Next, the translucent second layer is a color layer and can have a thickness of approximately 0.008 inch. The opaque third layer can have a thickness of approximately 0.002 inch. Moreover, the opaque third layer is thermally bonded to the coextruded first and second layers, according to one version of the present invention. In a preferred embodiment of the present invention, the transparent first layer is an interior layer, the translucent second layer is a middle layer, and the opaque third layer is an exterior layer.

The switch mat of the present invention further includes the stepped portion having a shoulder located a predetermined distance away from the first end of the projection for limiting travel of a button relative to the projection. And, the second end of the projection is connected to the generally planar sheet. In addition, the inner surface of the projection has variable thickness that is created by at least one axial groove provided on the projection for increasing interior cross-sectional area for light to pass to the at least one button for fully illuminating any indicia thereon. Further, the projection includes corners having a cross-sectional thickness greater than an adjacent side wall portion for insuring lateral strength of the projection. One disclosed version includes the projection having a generally rectangular cross-sectional shape.

The present invention is also directed to a method of making a component of a control panel comprising the steps of: providing a first layer of material, providing a second layer of material and coextruding the first layer of material to the second layer of material. The method also includes forming the coextruded first and second layers into a predetermined shape.

Another method step of the present invention involves applying a third layer of material onto the coextruded first and second layers. The step of applying can be carried out by at least one of thermally bonding, spraying, or printing. Still further, the forming step is optionally, but preferably performed after the step of applying the third layer to improve processing and quality. More specifically, the step of forming can include vacuum forming.

The coextruding step further includes the first layer of material being generally transparent and the second layer of material being generally translucent. The forming step can include vacuum forming either a bezel, a button or both. Also, the method of the present invention includes providing indicia on the component.

Yet another method according to the present invention includes forming a component for a control panel comprising the steps of: providing a first layer of material, providing a second layer of material, coextruding the first layer of material to the second layer of material, vacuum forming the coextruded first and second layers into a predetermined shape, applying a third layer of material to the second layer, and selectively removing a portion of the third layer of material to expose a portion of the second layer for forming indicia on the component.

The present invention provides a control panel assembly and components that are more cost effective to fabricate and eliminates extra steps that are required to make previously known components. Control panel components provided in accordance with the present invention have an inner transparent layer, a middle translucent color layer, and an opaque outer surface layer. Indicia can be provided on the button or bezel using a laser etching technique that removes a predetermined portion of the opaque outer surface layer. The component can be vacuum formed from a multi-layer sheet that includes a co-extruded substrate having a generally transparent layer co-extruded with one or more translucent color layers. A thin outer opaque layer is thermally bonded to the co-extruded substrate using residual heat remaining from the co-extrusion process. Next the multi-layer sheet is vacuum formed to create a any number of components. As a result, the steps of painting multiple coats and drying each coat has been eliminated. Thus, environmental concerns associated with painting are eliminated. Further, the present invention provides a more uniform thickness to the outer opaque layer than is provided by painting. Moreover, the inner transparent layer is made sufficiently thick to provide adequate strength for the button, thereby eliminating the need to injection mold resin behind the button as in the prior art. By eliminating the injection molding step, the present invention substantially reduces tooling costs and tooling time versus known button making processes. In addition, cycle time to process the button is reduced from approximately 30 seconds to approximately 6 seconds. Therefore, costs of fabricating buttons is substantially reduced in accordance with the present invention.

The control panel assembly of the present invention further includes an elastomeric switch mat having a planar sheet portion with a plurality of projections that correspond to locations of buttons. Each projection has first and second ends and are generally hollow having side walls with inner and outer surfaces. The switch mat covers a printed circuit board having a light source. A projection channels light from the light source up to the button mounted thereon and allows the button to be backlit. Preferably, a stepped portion is provided at the first end of the projection for receiving the button. A shoulder is provided to act as a stop which limits the travel of the button onto the projection and spaces the inner surface layer of the button away from the first end of the projection to enable the light source to fully illuminate any indicia located on the button. Moreover, the side walls of the projections have variable thickness and include axial grooves to allow light to reach the inner surface layer of the button. The present invention therefore allows buttons having greater arcuately shaped or contoured top surfaces to be used without the drawback of having idicia being blocked off from light by a side wall of the projection.

As a result, the present invention provides a control panel assembly such as those used on the interior of automotive vehicles that are cost effective, have improved feel to the user and have indicia that will not be rubbed off during its service life.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
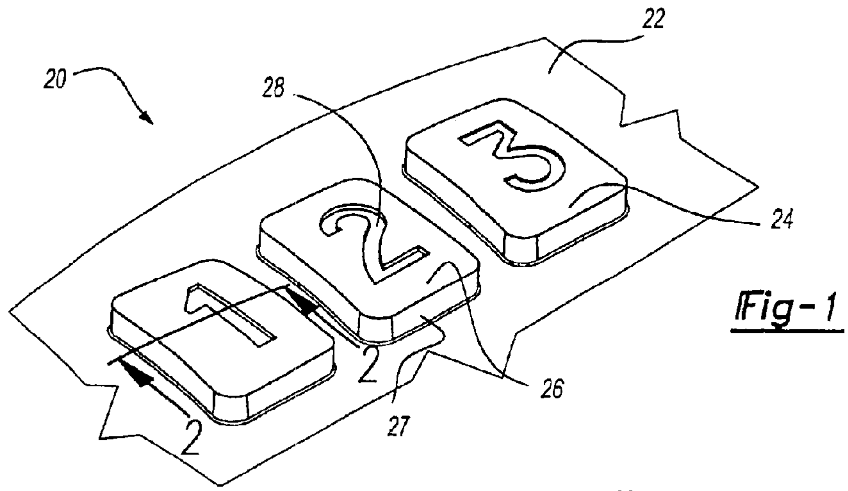
FIG. 1 shows a partial perspective view of a control panel assembly according to the present invention.

FIG. 1 shows a portion of a control panel assembly 20 having a bezel 22 and a plurality of buttons 24. Some control panel assemblies are found in vehicles in the form of radio control panels, heater/AC control panels, combination radio/heater/AC control panels. However, the present invention is directed to any suitable type of control panel assemblies, not just those found in vehicles. Button 24 has a top surface 26 and side walls 27. Top surface 26 includes indicia 28 to inform a user of a particular function of button 24. Preferably, button 24 is of the backlit type such that under low light conditions, indicia 28 can be illuminated to allow a user to readily find a particular button 24. In addition, bezel 22 can include indicia for explaining control panel functions to a user.

Figure 2:
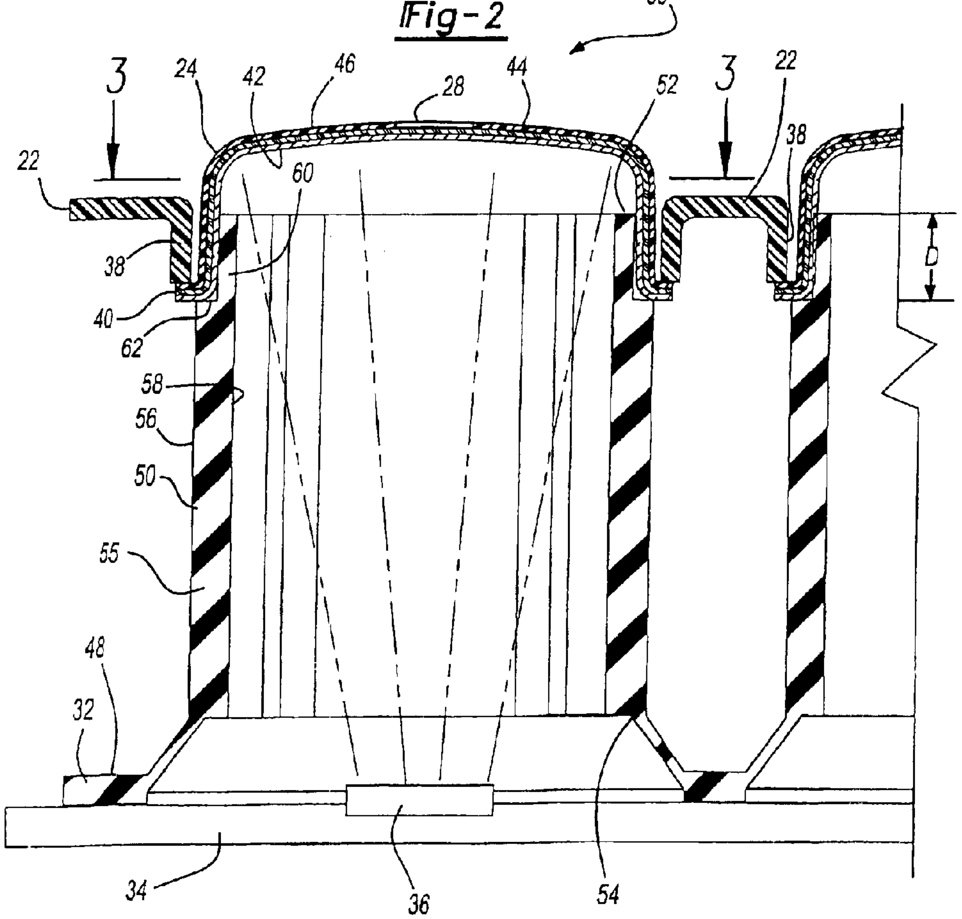
FIG. 2 shows an elevational cross-section of a control panel assembly according to the present invention.

FIG. 2 shows a cross section of a control panel assembly 30 including button 24 connected to an elastomer switch mat 32 which overlies a printed circuit board 34 and optionally includes a light source 36 to provide a backlit feature. Bezel 22 includes a downwardly depending flange 38 that helps guide button 24 when it is pressed in and resiliently returns. Button 24 has first and second flange portions 40 that abut bezel flange 38 and prevent unwanted removal of button 24 from bezel 22. Button 24 further includes an inner surface layer 42 that is generally transparent. An outer surface layer 44 of cap 24 is generally opaque. A middle surface layer 46 located between inner surface layer 42 and outer surface layer 44 is a generally translucent color layer. Indicia 28 is preferably formed on button 24 using a laser etching technique that removes a predetermined portion of opaque outer surface layer 44 to reveal the translucent middle color layer 46.

Although bezel 22 is illustrated as having one layer, it should be understood that other control panel components, such as bezels, can be fabricated using the same multi-layer techniques that are described for fabricating button 24.

Switch mat 32 includes a generally planer sheet portion 48 having a plurality of upward projections 50 that correspond to locations for buttons 24. Projections 50 each have first and second ends 52, 54 and are generally hollow having side walls 55 with inner and outer surfaces 56, 58. First end 52 receives button 24 and has a stepped portion 60 on outer surface 58 that includes a shoulder 62 which acts as a stop to limit travel of button 24 over projection 50. Shoulder 62 is located a predetermined distance D away from first end 52 such that button inner surface layer 42 is raised a sufficient distance away from first end 52 to allow light source 36 to fully illuminate any indicia 28 on button 24, especially if button 24 has an arcuate surface. Second end 54 of projection 50 connects to sheet portion 48 and includes a tapered base 64 that is designed to allow resilient flexing of switch mat 32 when button 24 is pressed. Stepped portion 60 and shoulder 62 also provide an improved structural connection between button 24 and projection 50 that efficiently transfers a pressing force applied on button 24 to projection 50 and switch mat 32 and circuit board 34. The present design also accommodates increased pressing force versus prior known devices.

Further, the present invention allows buttons 24 to be formed with a greater arcuately shaped or more contoured top surface 26 to be used without the drawback of having idicia 28 being blocked off from light by side wall 27.

Figure 3:
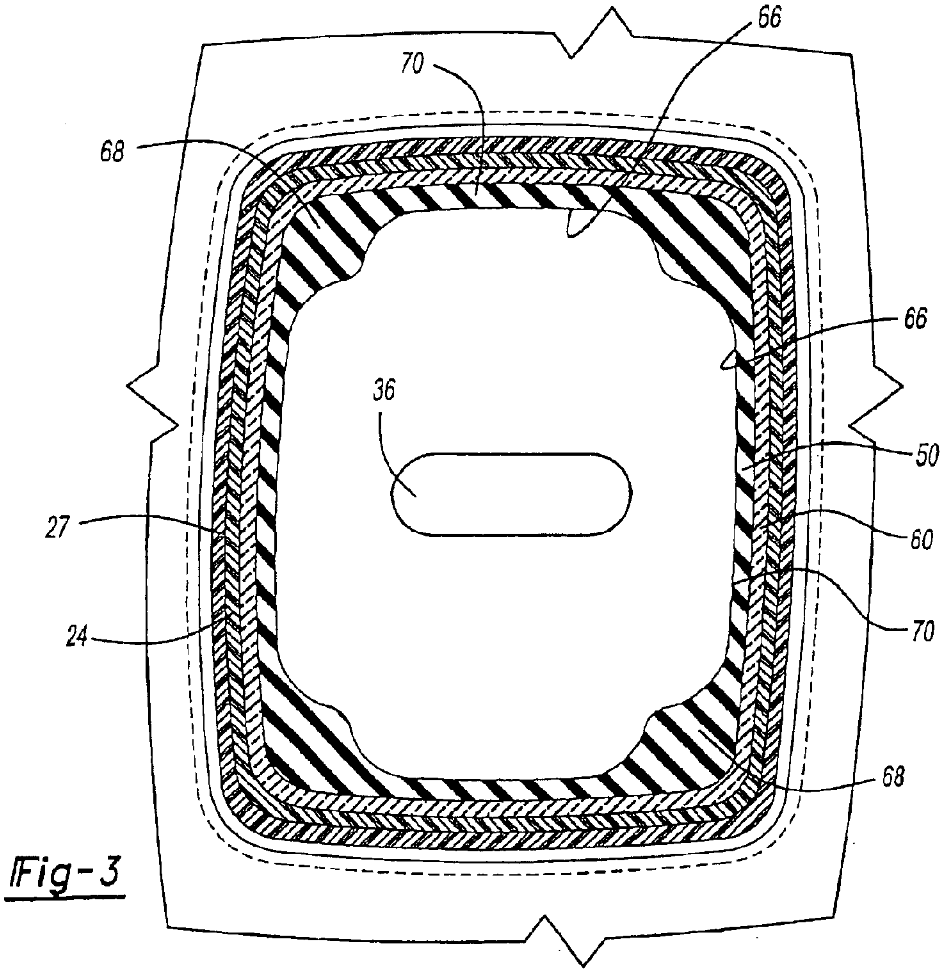
FIG. 3 shows a top cross-sectional view taken along line 3—3 of FIG. 2.

FIG. 3 shows a top view taken along the line 3—3 in FIG. 2. Side walls 27 of button 24 surround stepped portion 60 of switch mat projection 50. Preferably, inner surfaces 56 of projection 50 have variable thickness created by one or more axial grooves 66 to insure that light source 36 can fully illuminate button 24 and indicia 28 located thereon. Corners 68 of projection 50 preferably have greater cross-sectional thickness than adjacent side wall portions 70 to insure lateral strength of projection 50. Projection 50 is shown in FIG. 3 having a generally rectangular cross-section. However, any suitable shape can be used, including but not limited to, circular, oval, and polygonal. Next, the method of fabricating buttons 24 will be discussed. FIGS. 4–8 illustrate various stages in the button fabrication process.

Figure 4:
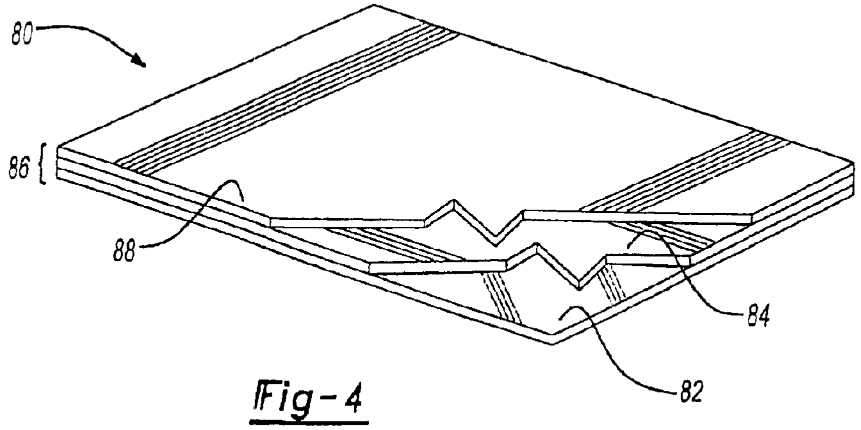
FIGS. 4 and 5 show various stages in the process of making a control panel component according to the present invention.

FIG. 4 shows a multi-layer sheet 80 that can be used to form components of control panel assemblies including, for example, bezels or buttons. In particular, multi-layer sheet 80 includes a first generally transparent layer 82 having one or more generally translucent colored layers 84. Preferably, transparent layer 82 and translucent layer 84 are co-extruded to create a layered substrate 86. The co-extrusion process is carried out at high heat whereby a thin outer opaque layer 88 can preferably be subsequently thermally bonded, in a lamination process, to translucent colored layer 84 using residual heat in co-extruded substrate 86. However, it is also contemplated that multi-layer sheet 80 is a co-extrusion of all the layers, multiple laminated sheets or a mixture of extruded and laminated sheets. Further, it is contemplated that layered substrate 86 is formed from a single extrusion and one or more laminated layers. One of ordinary skill will readily understand that other variations for manufacturing multi-layer sheet 80 are possible. For example, instead of laminating outer opaque layer 88, an outer opaque layer can be applied using screen printing techniques.

Preferably transparent layer 82 and translucent layer 84 are made from impact modified polystyrene having a thickness of approximately 0.040 inch to provide sufficient strength to button 24. However, any suitable thickness can be used and other suitable materials including, for instance, polycarbonate can be used. In a preferred embodiment, translucent color layer 84 is white and has a thickness of approximately 0.008 inch. However, as discussed above, translucent color layer 84 can be a plurality of different color layers to allow a different color when backlit than during non-backlit situations. Outer opaque layer 88 is preferably a resilient acrylic based material having a thickness of approximately 0.002 inch. One preferred color for opaque layer 88 is black. But, any suitable thickness, material, or color can be used.

Figure 5:
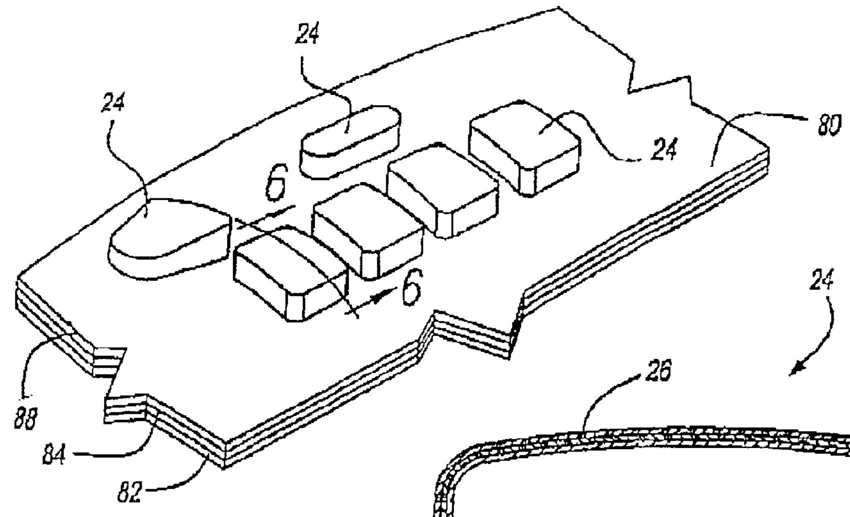

Next, as shown in FIG. 5, multi-layer sheet 80 is vacuum formed creating one or more buttons 24. As illustrated, buttons 24 can have any suitable shape including, but not limited to, rectangular, oval, and semi-elliptical. Vacuum forming is preferred for its low cost and high efficiency. However, other suitable manufacturing techniques can be used to form buttons 24, including but not limited to, cold forming. Forming techniques will vary based on particular button designs.

Figure 6:
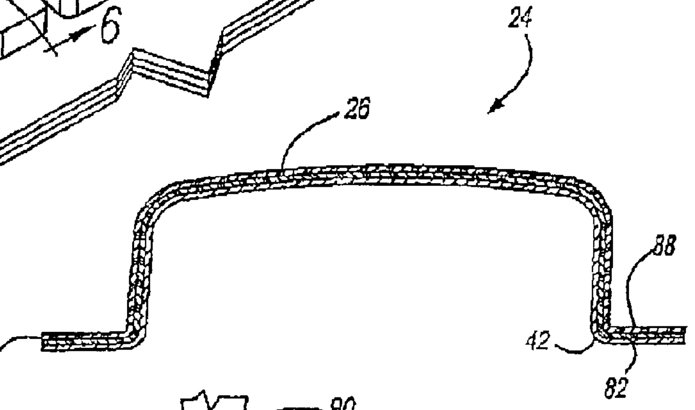
FIG. 6 is a cross-sectional view taken along line 6—6 of FIG. 5.

FIG. 6 shows a cross-section of button 24 taken through line 6—6 of FIG. 5 and illustrates transparent layer 82 as inner surface layer 42 and translucent color layer 84 is located above transparent layer 82 which is in turn covered by outer opaque layer 88 to from top surface 26.

Figure 7:
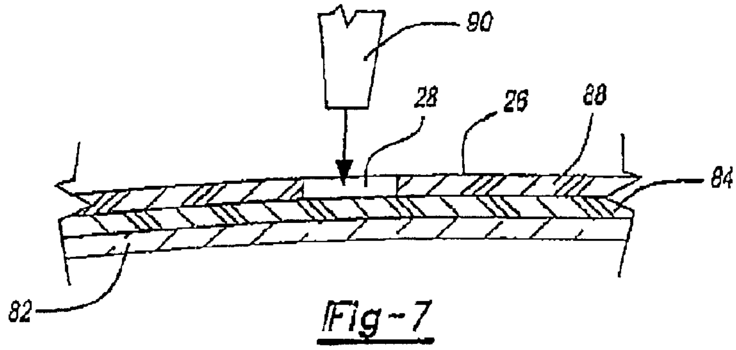
FIGS. 7 and 8 show further process steps in making a control panel component according to the present invention.

As shown in FIG. 7, if it is desired to form indicia on button 24, then a laser 90 can be used to selectively remove a predetermined portion of outer opaque layer 88 to reveal underlying color layer 84 to define the indicia 28 on a component of a control panel assembly. As discussed above, translucent color layer 84 is preferably white and outer opaque layer 88 is preferably black. Thus, light from laser 90 is absorbed by black opaque layer 88 but not by white translucent layer 84. In addition, outer opaque layer 88 is preferably very thin so that indicia 28 is close to top surface 26 and feels smooth to the touch of a user. However, any suitable technique that can produce indicia on a control panel component can be used.

Figure 8:
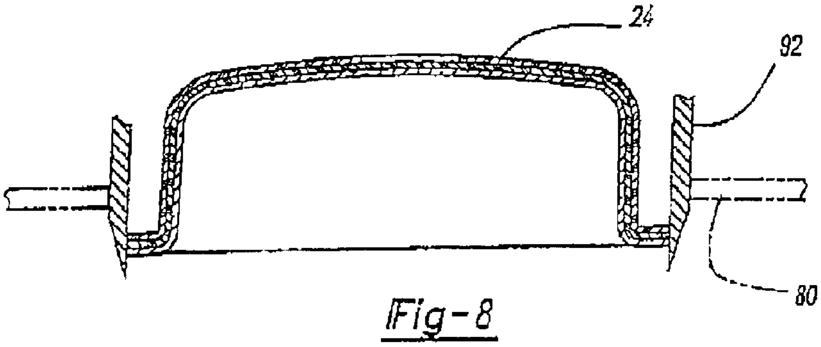

FIG. 8 shows a die cutter 92 which is used to die cut button 24 from the remainder of vacuum formed multi-layer sheet 80 (shown in phantom). The button is now in its finished state and ready to be assembled into a control panel 20. In another variation, button 24 can be installed onto switch mat 32 before the step of laser etching indicia 28.

Alternatively, button 24 can be made by vacuum forming just co-extruded multi-layer substrate 86, which includes generally transparent layer 82 and generally translucent color layer 84. After vacuum forming, an outer opaque layer 88 can be applied to co-extruded multi-layer substrate 86 using a conventional technique such as spraying. Afterward, laser etching is performed to provide indicia 28.

Although button 24 has been described and shown for exemplary purposes to illustrate a multi-layer control panel component, the present invention equally applies to and encompasses other control panel components that can be multi-layer. Other multi-layer control panel components that can be similarly fabricated include, but are not limited to, radio bezels and heater control bezels. Optionally, if greater strength or rigidity is required for a bezel, then the bezel can subsequently have reinforcing structure added to its interior surface, for example by injection molding. Bezels of control panels also have indicia for operators and the present invention provides an economic approach for providing indicia on a control panel component, especially backlit indicia.

Preferred embodiments of the present invention have been disclosed. A person of ordinary skill in the art would realize, however, that certain modifications would come within the teachings of this invention.

What is claimed is:

1. A method of forming a component for a control panel, the component being vacuum formed and having a shaped main body, the main body including first and second layers and a third layer applied to said second layer wherein said first layer is generally transparent, said second layer is generally translucent, and said third layer is generally opaque; the method comprising the steps of:

coextruding the first layer and the second layer of material;

vacuum forming coextruded first and second layers into a predetermined shape; and applying the third layer to the second layer.

2. The method of claim 1, wherein the step of applying includes one of thermally bonding, spraying, or printing.

3. The method of claim 1, wherein the vacuum forming step is preformed after the step of applying said third layer.

4. The method of claim 1, wherein the vacuum forming step includes vacuum forming a bezel.

5. The method of claim 1, wherein the vacuum forming step includes vacuum forming a button.

6. The method of claim 1, further comprising providing indicia on said component.

7. A method of forming a component for a control panel, the component including a main body including first and second layers and a third layer applied to said second layer; and a third layer applied to the second layer, wherein said first layer is generally transparent, said second layer is generally translucent, and said third layer is generally opaque, the method comprising the steps of:

coextruding the first layer and the second layer of material;

vacuum forming said coextruded first and second layers into a predetermined shape;

applying the third layer of material to said second layer; and selectively removing a portion of said third layer of material to expose a portion of said second layer for forming indicia on said component.

8. The method of claim 7, wherein said step of applying includes one of thermally bonding, spraying, or printing.

* * * * *